United States Patent
Minnella

(10) Patent No.: US 10,683,106 B2
(45) Date of Patent: Jun. 16, 2020

(54) STRUCTURAL HEALTH MONITORING SYSTEMS

(71) Applicant: Sikorsky Aircraft Corporation, Stratford, CT (US)

(72) Inventor: Christopher M. Minnella, Pittsford, NY (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 205 days.

(21) Appl. No.: 15/927,777

(22) Filed: Mar. 21, 2018

(65) Prior Publication Data

US 2019/0291897 A1 Sep. 26, 2019

(51) Int. Cl.

| | |
|---|---|
| *G01N 25/72* | (2006.01) |
| *G01K 17/00* | (2006.01) |
| *G01K 1/00* | (2006.01) |
| *B64F 5/60* | (2017.01) |
| *B64C 27/46* | (2006.01) |
| *G01K 1/14* | (2006.01) |
| *G01K 11/12* | (2006.01) |

(52) U.S. Cl.
CPC .............. *B64F 5/60* (2017.01); *B64C 27/46* (2013.01); *G01K 1/14* (2013.01); *G01K 11/12* (2013.01); *G01N 25/72* (2013.01)

(58) Field of Classification Search
None
See application file for complete search history.

(56) References Cited

U.S. PATENT DOCUMENTS

| | | | |
|---|---|---|---|
| 6,971,792 B2 * | 12/2005 | de Ris ................... | G01N 25/18 374/1 |
| 7,413,919 B2 | 8/2008 | Qing et al. | |
| 8,521,444 B2 | 8/2013 | Banerjee et al. | |
| 8,726,737 B2 | 5/2014 | Georgeson et al. | |
| 2005/0105583 A1 * | 5/2005 | Xiao .................... | G01N 17/008 374/29 |
| 2006/0045165 A1 * | 3/2006 | Chan ....................... | G01N 3/60 374/43 |
| 2008/0075137 A1 * | 3/2008 | Cervantes .............. | G01N 25/18 374/1 |
| 2014/0070654 A1 * | 3/2014 | Hamer ................. | H02K 1/2766 310/156.21 |
| 2020/0031028 A1 * | 1/2020 | Suzuki .................. | H01L 33/641 |

* cited by examiner

*Primary Examiner* — Mirellys Jagan
(74) *Attorney, Agent, or Firm* — Cantor Colburn LLP

(57) ABSTRACT

In accordance with at least one aspect of this disclosure, a structure can include a body, and one or more thermal sheet sensors disposed on or within the body. The one or more thermal sheet sensors can be configured to receive heat from the body to allow sensing of thermal flux through the body to monitor and/or determine a condition of the structure.

13 Claims, 4 Drawing Sheets

STRUCTURAL HEALTH MONITORING SYSTEMS

BACKGROUND

1. Field

The present disclosure relates to structural health monitoring systems.

2. Description of Related Art

There are certain failure modes of laminated composite structures where the damage is hidden from view, for example delamination, disband, core crush, etc. There are various nondestructive inspection (NDI) methods used to detect and isolate these faults, but these methods are not conducive to onboard, online deployment. For example, ultrasonic scanners or thermal imaging methods can be used.

However, ultrasonic scanners require highly skilled operators to manually traverse a part looking for anomalies. Thermal imaging methods are commonly used in NDI to simultaneously inspect large parts, but require specialized fixtures and light/heat sources. The cameras used in these systems are very expensive and are used externally to the structure. Piezoelectric-based active and passive ultrasonic techniques may be more readily deployable onto the structure; however, the required sensor density can be high for larger or more complicated parts. Also, these piezo-electric based technologies have not proven to be very accurate at locating or assessing the size of damage.

Such conventional methods and systems have generally been considered satisfactory for their intended purpose. However, there is still a need in the art for improved structural health monitoring systems. The present disclosure provides a solution for this need.

SUMMARY

In accordance with at least one aspect of this disclosure, a structure (e.g., an aircraft structure) can include a body, and one or more thermal sheet sensors disposed on or within the body. The one or more thermal sheet sensors can be configured to receive heat from the body to allow sensing of thermal flux through the body to monitor and/or determine a condition of the structure.

The structure can be a helicopter rotor blade having a laminated structure. Any other suitable structure is contemplated herein. The structure can include one or more thermal sheet heaters disposed on or within the body to provide heat to the body to allow thermal transient evaluation using the one or more thermal sheet sensors.

The one or more sheet sensors can be disposed on the outer surface of the structure. In certain embodiments, the one or more sheet sensors include a temperature sensitive coating that changes visual color based on the temperature.

In certain embodiments, the one or more thermal sheet sensors can be disposed within the laminated structure of the rotor blade. In certain embodiments, the one or more thermal sheet heaters can be disposed within the laminated structure of the rotor blade to provide heat to the body to allow thermal transient evaluation using the one or more thermal sheet sensors.

The one or more thermal sheet sensors can be disposed along the entire length of the structure. Any other suitable coverage is contemplated herein. For example, the one or more thermal sheet sensors can be disposed in predetermined locations of the structure that are damage prone.

The one or more sensors can be permanently attached on or within the structure. It is contemplated that the one or more sensors may be removable in certain embodiments.

The structure can include a computerized device disposed on or within the structure and operatively connected to the one or more thermal sheet sensors to receive signals therefrom, and to process the signals to determine structural health. The computerized device can be configured to control the one or more thermal sheet heaters to output a predetermined heat.

The computerized device can be configured to compare thermal transient data, based on the location of the thermal signals on the thermal sheet sensor, to expected thermal transient data for a predetermined heat input. In certain embodiments, the structure can include a wireless communication system connected to the one or more thermal sheet sensors to allow wireless data communication of the thermal sheet sensors with a computerized device.

In accordance with at least one aspect of this disclosure, a system for determining structural health of a structure can include a computerized device operatively connected to one or more thermal sheet sensors disposed on or within a structure. The computerized device can be configured to receive thermal signals from the one or more thermal sheet sensors to create thermal transient data based on the location of the thermal signals on the one or more thermal sheet sensors, and compare the thermal transient data to expected thermal transient data or to one or more other locations of the structure to determine structural health of the structure.

The computerized device can be configured to create a thermal map of the one or more thermal sheet sensors based on the location of the thermal signals and/or to determine whether one or more hot spots or cool spots exist. The computerized device can include a wired or wireless communication system configured to connect to an aircraft systems monitoring computer (e.g., on board the aircraft) or a maintenance computer, for example.

In accordance with at least one aspect of this disclosure, a method for determining or monitoring the health of a structure can include inputting heat to structure and determining the condition of the structure as a function of thermal transients through the structure. Determining the condition of the structure can include receiving thermal signals from one or more thermal sheet sensors, disposed on or within the structure, to create thermal transient data based on the location of the thermal signals on the one or more thermal sheet sensor, and comparing the thermal transient data to expected thermal transient data or to one or more other locations of the structure to determine structural health of the structure.

Inputting heat can include creating heat with a thermal sheet heater disposed on or within the structure. Determining the condition of the structure can include creating a thermal map of the one or more thermal sheet sensors based on the location of the thermal signals and/or to determine whether one or more hot spots or cool spots exist.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
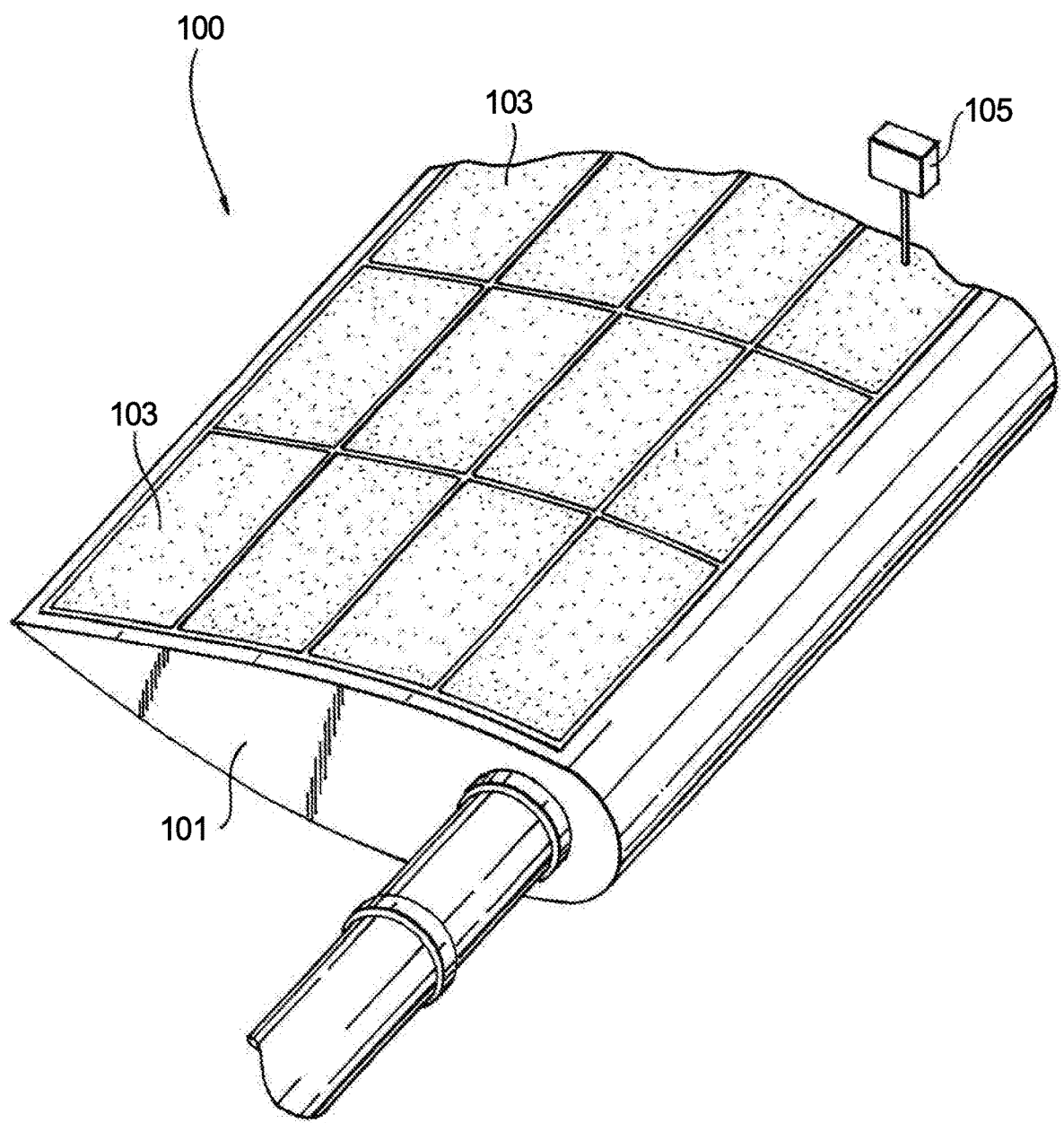
FIG. 1 is a perspective view of an embodiment of a structure in accordance with this disclosure.

Reference will now be made to the drawings wherein like reference numerals identify similar structural features or aspects of the subject disclosure. For purposes of explanation and illustration, and not limitation, an illustrative view of an embodiment of a structure in accordance with the disclosure is shown in FIG. 1 and is designated generally by reference character 100. Other embodiments and/or aspects of this disclosure are shown in FIGS. 2-6.

In accordance with at least one aspect of this disclosure, referring to FIG. 1, a structure 100 (e.g., an aircraft structure) can include a body 101, and one or more thermal sheet sensors 103 disposed on or within the body 101. The one or more thermal sheet sensors 103 can be configured to receive heat from the body 101 to allow sensing of thermal flux through the body 101 to monitor and/or determine a condition of the structure 100. The one or more thermal sheet sensors 103 can include any suitable conformal and/or thin sheet shaped temperature sensitive material or device (e.g., one or more thin film array sensors). In certain embodiments, as shown, the structure 100 can be a helicopter rotor blade can have a laminated structure (not specifically shown for clarity).

Figure 2:
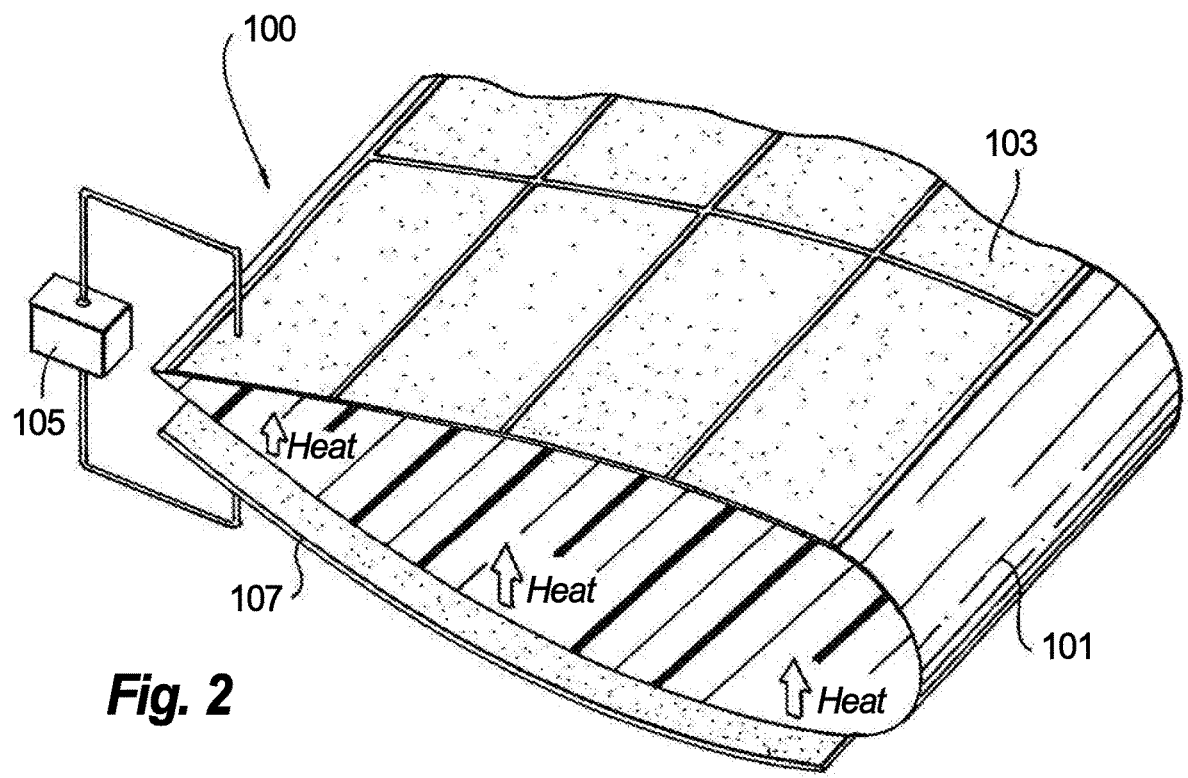
FIG. 2 is a cross-sectional view of an embodiment of a structure in accordance with this disclosure.

Any other suitable structure is contemplated herein (e.g., airframe components, or non-aircraft related structures). Referring additionally to FIG. 2, the structure 100 can include one or more thermal sheet heaters 107 disposed on or within the body 101 to provide heat to the body 101 to allow thermal transient evaluation using the one or more thermal sheet sensors 103. The one or more thermal sheet sensors 103 and/or heaters 107 can be disposed on the outer surface of the structure 101, e.g., as shown in FIGS. 1 and 2. In such embodiments, the one or more sheet sensors 103 can include a temperature sensitive coating that changes visual color based on the temperature of the body 101 to allow a visual inspection (e.g., via a visual camera system and/or via the human eye) of the thermal transient response of the structure 101.

Figure 3:
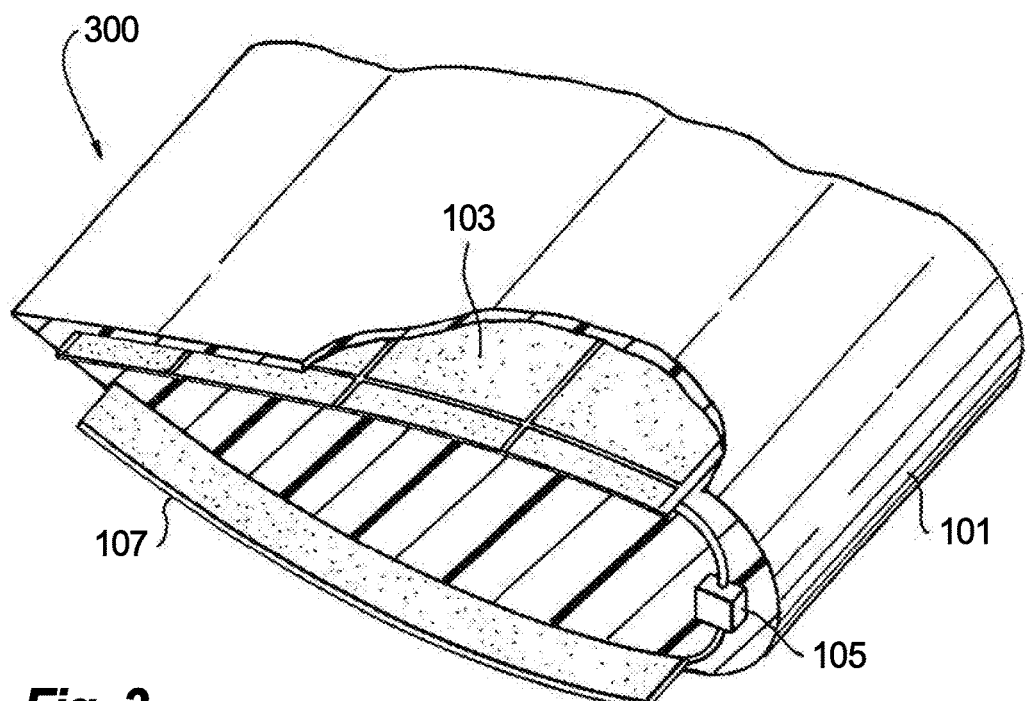
FIG. 3 is a cross-sectional view of an embodiment of a structure in accordance with this disclosure.
Figure 4:
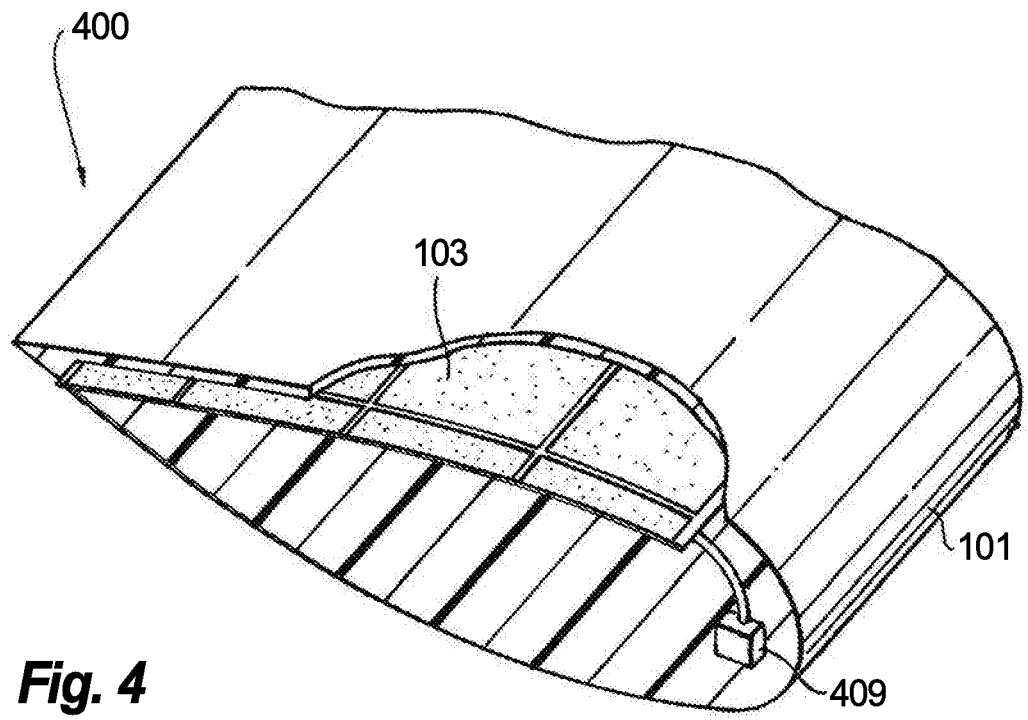
FIG. 4 is a cross-sectional view of an embodiment of a structure in accordance with this disclosure.
Figure 5:
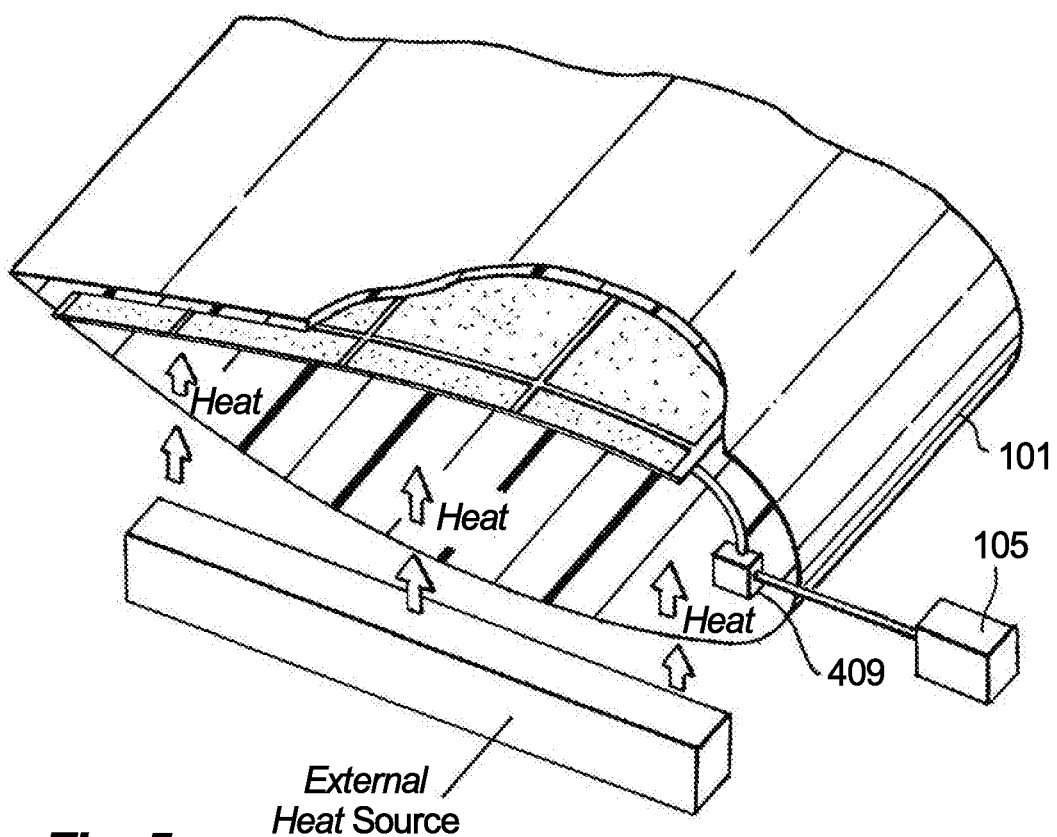
FIG. 5 is a cross-sectional view of an embodiment of FIG. 4, showing external heat application.

Referring to FIGS. 3-5, in certain embodiments, the one or more thermal sheet sensors 103 can be disposed within the structure 300, 400, e.g., within the laminated structure of the rotor blade. In certain embodiments, the one or more thermal sheet heaters 107 can also or independently be disposed within the structure, as shown in FIG. 3, e.g., within laminated structure of the rotor blade, to provide heat to the body 101 to allow thermal transient evaluation using the one or more thermal sheet sensors 103.

In certain embodiments, the one or more thermal sheet sensors 103 can be disposed along the entire length of the structure 100. Any other suitable coverage is contemplated herein. For example, the one or more thermal sheet sensors 103 (e.g., a patch of a thin film array sensor) can be disposed only or at least in predetermined locations of the structure 100 that are damage prone (e.g., near the root). For a rotor blade as shown, the one or more thermal sheet sensors 103 can be positioned on or near an underside of the rotor blade. In certain embodiments that include one or more thermal sheet heaters 107, the thermal sheet heaters 107 can be positioned on or near an opposite side of the structure 100 (e.g., a top side of the rotor blade).

In certain embodiments where no thermal heater is used, it can be beneficial to have the one or more thermal sheet sensors 103 disposed on the underside of the blade as the sun can act as a heat source allowing transient analysis without input heat. This can be referred to as passive heating as opposed to active heating with a thermal heater (for example, passive heating doesn't require any heating hardware and can take advantage of environmental opportunities whereas active heating requires some hardware, e.g., either onboard or off board, to inject a controlled thermal transient in the structure).

The one or more thermal sheet sensors 103 can be permanently attached on or within the structure 100 (e.g., via laminating and/or an adhesive). It is contemplated that the one or more sensors 103 may be removable in certain embodiments (e.g., a removable tape thin film array with non-permanent adhesive).

The structure 100 can include a computerized device 105 disposed on or within the structure 100 and operatively connected to the one or more thermal sheet sensors 103 to receive signals therefrom, and to process the signals to determine structural health. The computerized device 105 can include any suitable computer hardware and/or software to perform the disclosed functions, and/or any other suitable function. In certain embodiments, no computerized device 105 is included with the structure 100, and an external computerized device 105 can be used.

The computerized device 105 can be configured to control the one or more thermal sheet heaters 107 to output a predetermined heat, for example. As shown in FIGS. 4 and 5, in certain embodiments without sheet heaters 107, the computerized device 105 can be operatively connected to an external heat source 507 if receiving heat input data is desired, or if control of the external heat source 507 is desired. In certain embodiments, no control or connection to a heat source is required. For example, the one or more thermal sheet sensors 103 can sense heat applied to the structure by any suitable external source, e.g., the sun.

The computerized device 105 can be configured to compare thermal transient data, based on the location of the thermal signals on the thermal sheet sensor 103, to expected thermal transient data for a predetermined heat input, for example. In certain embodiments, e.g., as shown in FIGS. 4 and 5, the structure 400 can include a wireless communication system 409 connected to the one or more thermal sheet sensors to allow wireless data communication of the one or more thermal sheet sensors 103 with a computerized device 105 (e.g., either attached to the structure 300 or external to the structure 300). The wireless communication system 409 can include any suitable components (e.g., a power source, a digitizer, a radio module). For example, to test the health of a rotor blade, a technician can connect to the wireless communication system 409 with a computerized device 105 and received the desired data without having to remove the blade from the helicopter. Any other suitable wired or wireless connection and/or hardware/software is contemplated herein for connecting the thermal sheet sensors 103 to an onboard or off-board computerized device.

In accordance with at least one aspect of this disclosure, a system for determining structural health of a structure can include a computerized device 105 operatively connected to one or more thermal sheet sensors 103, e.g., disposed on or within a structure 100, or external to the structure 100. The computerized device 105 can be configured to receive thermal signals from the one or more thermal sheet sensors 103 to create thermal transient data based on the location of the thermal signals on the one or more thermal sheet sensors 103, and compare the thermal transient data to expected thermal transient data or to one or more other locations of the structure 100 to determine structural health of the structure 100.

Figure 6:
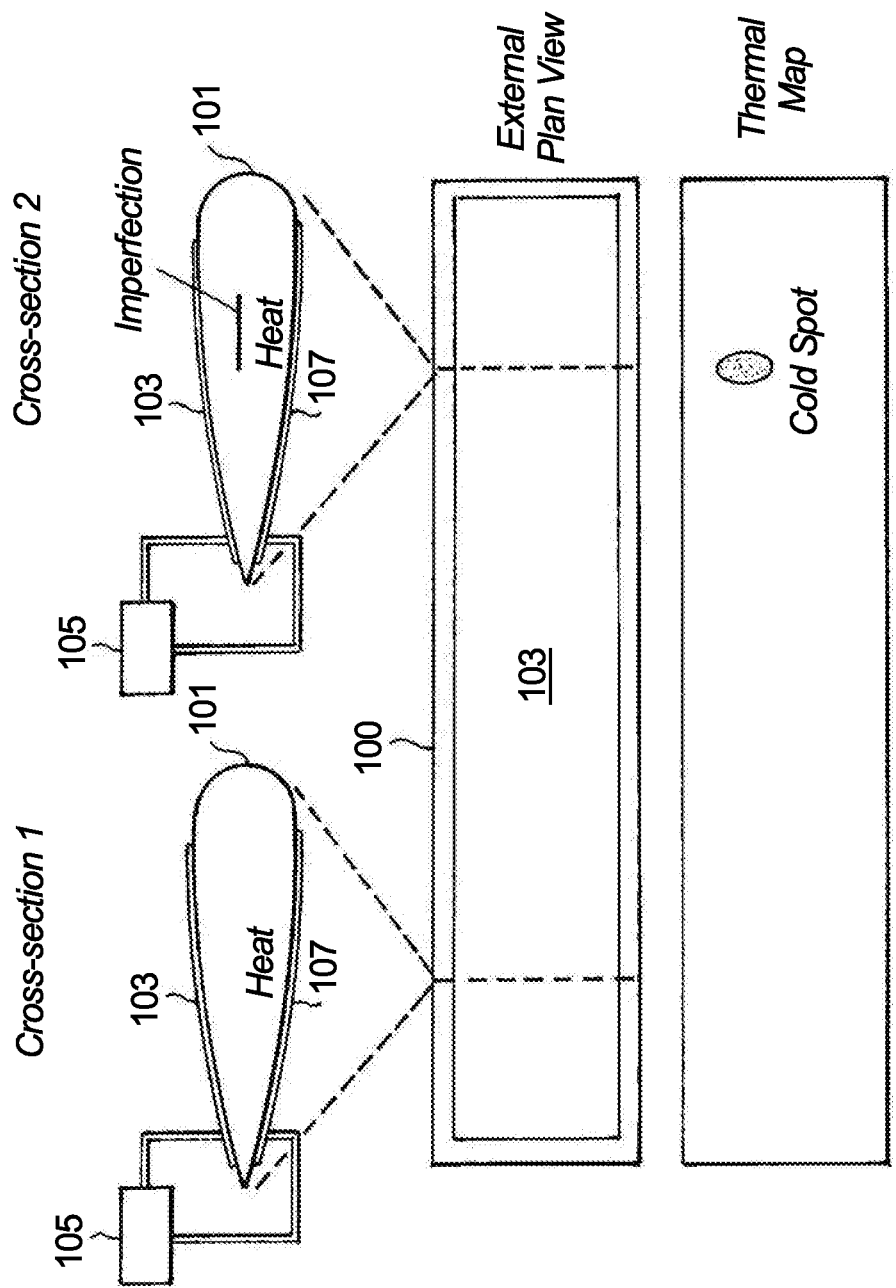
FIG. 6 is a schematic diagram of an embodiment of a structure in accordance with this disclosure, showing two different cross-sections of the structure at different lengths of the structure, along with a thermal map indicating structure condition.

In certain embodiments, the computerized device 105 can be configured to create a thermal map, e.g., as shown in FIG. 6, of the one or more thermal sheet sensors 103 based on the location of the thermal signals and/or to determine whether one or more hot spots or cool spots exist. In certain embodiments, e.g., where the computerized device 105 is onboard the structure 100, the computerized device 105 can include a wired or wireless communication system configured to connect to an aircraft systems monitoring computer (e.g., on board the aircraft) or a maintenance computer, for example.

Referring to FIGS. 5 and 6, in accordance with at least one aspect of this disclosure, a method for determining or monitoring the health of a structure can include inputting heat to structure 100 (e.g., via an external source as shown in FIG. 5, or via an onboard source as shown in FIG. 6) and determining the condition of the structure 100 as a function of thermal transients through the structure 100. Determining the condition of the structure can include receiving thermal signals from one or more thermal sheet sensors 103, disposed on or within the structure 100, to create thermal transient data based on the location of the thermal signals on the one or more thermal sheet sensor 103 and comparing the thermal transient data to expected thermal transient data or to one or more other locations of the structure 100 to determine structural health of the structure 100.

As shown in FIG. 6, inputting heat can include creating heat with a thermal sheet heater 107 disposed on or within the structure 100. Determining the condition of the structure 100 can include creating a thermal map of the one or more thermal sheet sensors 103 based on the location of the thermal signals and/or to determine whether one or more hot spots or cool spots exist.

A method can include disposing one or more thermal sheet sensors 103 on or within a structure 100. For example, the method can include laminating the one or more thermal sheet sensors 103 into a rotor blade structure.

Embodiments enable monitoring heat flux through many points of a structure. Embodiments can include one or more sheets of sensors and/or heaters positioned anywhere, in any array or pattern, on or within a structure. Embodiments can include integral sensors/heaters (e.g., between laminates) and/or sensors/heaters that are placed and/or printed on the structure 100. In certain embodiments, any and/or all systems (e.g., heater, sensor, computer and/or communication systems) can be made on a single laminate sheet and used as part of a structure 100.

Developments in flexible hybrid electronics (FHE) have produced thin, conformable, transparent image sensors as well as dense arrays of discrete temperature sensors on flexible, stretchable substrates. In certain embodiments, such conformable sensors could be wrapped around the exterior or embedded within a composite rotor blade structure. Active heating from within the blade, or passive heating from the environment (e.g., sunlight) could be used to induce a thermal transient on the structure. A dense array of discrete temperature monitoring devices on the surface, or a mat of high resolution image detectors sensitive to infrared light could monitor the transient behavior of the heat as it is diffused throughout the structure.

As appreciated by those having ordinary skill in the art, generally, irreversible phenomena are the signature of the occurrence of damage. Mapping the thermal state of a structure can be a means to detect abnormalities in the mechanical behavior of the structure. However, traditionally, this technique is applied with one or more thermal cameras mounted in such a way to observe the changes on the structure with time. The camera(s) must remain static with respect to the structure, and the placement must be optimized to capture the area of interest within the frame of view of the image sensor. By physically attaching the physical image sensor (e.g., an IR sensitive image sensor) or array of temperature sensitive transducers to the surface of interest or within the structure in places of interest or throughout the structure, thermal analysis is enabled for online/onboard use, and all areas of interest can be captured simultaneously. Embodiments are an improvement over traditional systems and methods because the sensing elements are intrinsic to the part, can be placed optimally or anywhere, and the system can be used onboard and in a much faster and more efficient manner.

By way of example, aspects of the invention can be used in coaxial helicopters, on tail rotors, or wings or propeller blades on fixed or tilt wing aircraft.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code and/or data embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. Program code as described herein can be or include any suitable computer software. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A structure, comprising:
    a body; and
    one or more thermal sheet sensors disposed on or within the body and configured to receive heat from the body to allow sensing of thermal flux through the body to monitor and/or determine a condition of the structure, wherein the structure is a helicopter rotor blade having a laminated structure.

2. The structure of claim 1, further comprising one or more thermal sheet heaters disposed on or within the body to provide heat to the body to allow thermal transient evaluation using the one or more thermal sheet sensors.

3. The structure of claim 1, wherein the one or more sheet sensors are disposed on the outer surface of the structure.

4. The structure of claim 1, wherein the one or more sheet sensors include a temperature sensitive coating that changes visual color based on the temperature.

5. The structure of claim 1, wherein the one or more thermal sheet sensors are disposed along the entire length of the structure.

6. The structure of claim 1, wherein the one or more thermal sheet sensors are disposed in predetermined locations of the structure that are damage prone.

7. The structure of claim 1, wherein the one or more sensors are permanently attached on or within the structure.

8. The structure of claim 1, further comprising a wireless communication system connected to the one or more thermal sheet sensors to allow wireless data communication of the thermal sheet sensors with a computerized device.

9. The structure of claim 1, wherein the one or more thermal sheet sensors are disposed within the laminated structure of the rotor blade.

10. The structure of claim 9, further comprising one or more thermal sheet heaters disposed within the laminated structure of the rotor blade to provide heat to the body to allow thermal transient evaluation using the one or more thermal sheet sensors.

11. The structure of claim 1, further comprising a computerized device disposed on or within the structure and operatively connected to the one or more thermal sheet sensors to receive signals therefrom, and to process the signals to determine structural health.

12. The structure of claim 11, wherein the computerized device is configured to control one or more thermal sheet heaters disposed on or within the body to output a predetermined heat.

13. The structure of claim 12, wherein the computerized device is configured to compare thermal transient data, based on the location of the thermal signals on the thermal sheet sensor, to expected thermal transient data for a predetermined heat input.

* * * * *